Figure 1:
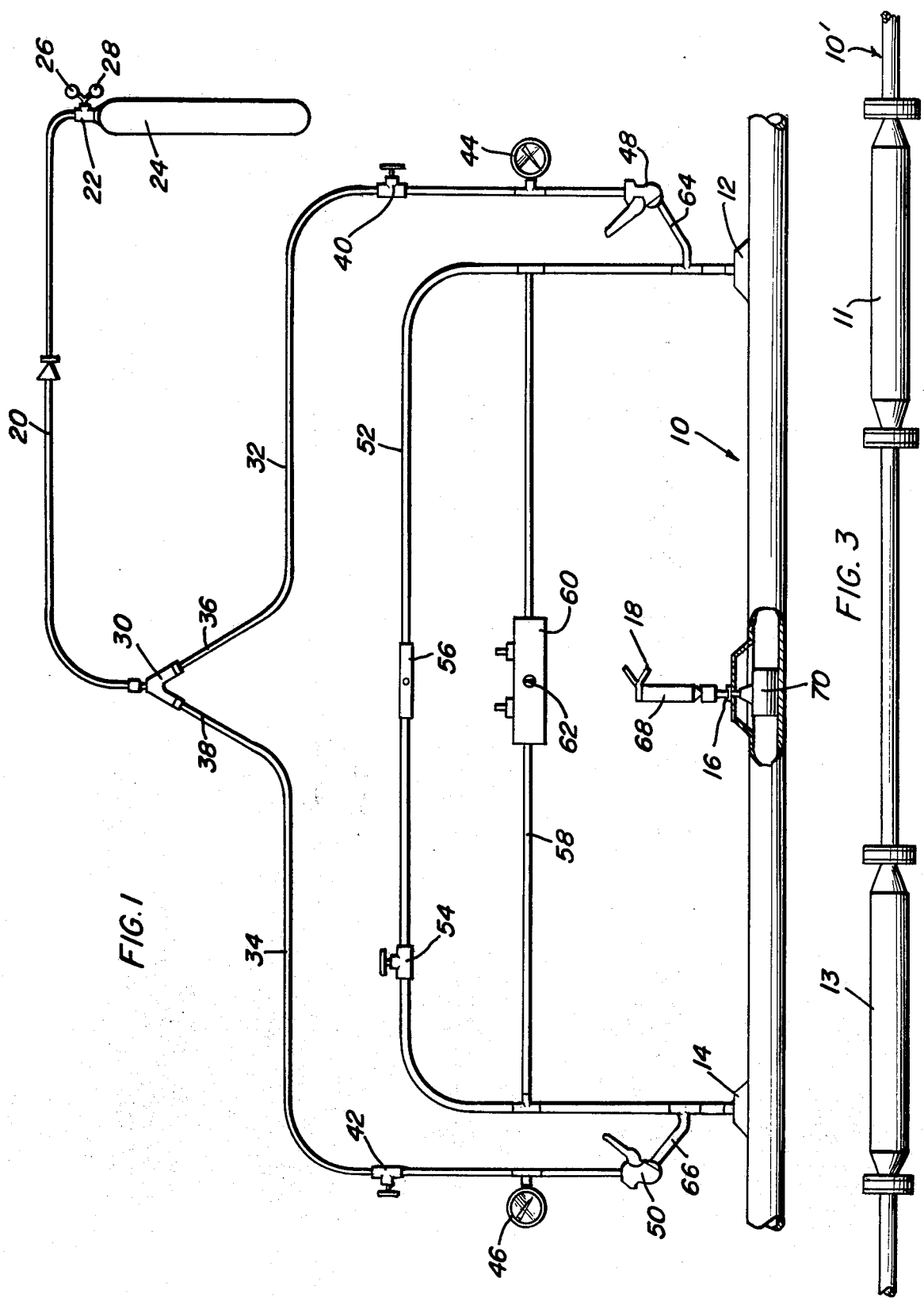

United States Patent [19]

Viramontes

[11] 3,958,606

[45] May 25, 1976

[54] METHOD AND APPARATUS FOR ELIMINATING AIR FLOW IN COMMUNICATIONS CABLES TO ASSIST IN PLUG FORMATION

[76] Inventor: Javier R. Viramontes, Star Rte., Box 18, Mesilla Park, N. Mex. 88047

[22] Filed: May 17, 1974

[21] Appl. No.: 471,131

[52] U.S. Cl. ............................. 138/97; 138/89; 137/13
[51] Int. Cl.² ........................................ F16L 57/00
[58] Field of Search ............... 138/37, 39, 89, 90, 138/92, 94, 97; 137/13, 78, 822–824

[56] References Cited
UNITED STATES PATENTS

| | | | |
|---|---|---|---|
| 2,043,227 | 6/1936 | Bennett | 174/11 R |
| 2,272,734 | 2/1942 | Witt | 138/94 |
| 2,276,443 | 3/1942 | Wilson | 138/89 X |
| 2,320,506 | 6/1943 | Bennett et al. | 138/89 X |
| 2,449,271 | 9/1948 | Bennett et al. | 174/11 R |
| 2,510,513 | 6/1950 | Mueller et al. | 138/97 |
| 3,115,163 | 12/1963 | Epps et al. | 138/94 |
| 3,298,398 | 1/1967 | Smith | 138/94 |
| 3,310,615 | 3/1967 | Bender | 138/89 X |
| 3,340,336 | 9/1967 | Bender | 138/89 X |
| 3,472,285 | 10/1969 | Ginsburgh et al. | 138/97 |
| 3,789,883 | 2/1974 | De Gregory | 137/824 |
| 3,845,789 | 11/1974 | Rohrer | 138/97 |

*Primary Examiner*—Richard E. Aegerter
*Assistant Examiner*—James E. Bryant, III
*Attorney, Agent, or Firm*—Clarence A. O'Brien; Harvey B. Jacobson

[57] ABSTRACT

A compressed gas system including a source of gas under pressure and a pair of delivery lines communicated at one pair of corresponding inlet ends with the source and provided with structure at the other pair of discharge ends for sealed attachment with fittings opening into a communication cable at points spaced therealong on opposite sides of a predetermined location in the cable in which a poured plug is to be formed is provided. A bypass line equipped with a double T bypass valve is connected in parallel between the delivery lines and a gas flow line equipped with an in-line gas flow indicator is also connected in parallel between the delivery lines. The gas flow line is provided with a shut-off valve and each of the delivery lines is equipped with a gas flow control valve and a gas pressure gauge downstream from the associated gas flow control valve.

4 Claims, 2 Drawing Figures

3,958,606

METHOD AND APPARATUS FOR ELIMINATING AIR FLOW IN COMMUNICATIONS CABLES TO ASSIST IN PLUG FORMATION

BACKGROUND OF THE INVENTION

A communication cable may extend for five miles within a city and the cable extends through a conduit and manhold system having perhaps a large number of laterals and stubbed splices within the same physical cable or to other cables within the communications system. The cable is internally pressurized with air at a pressure of perhaps 4 pounds above atmospheric pressure. Air is usually introduced under pressure into the cable at one end thereof and while the internal pressure may be 4 pounds at one end of the cable it may be only 2 pounds or less at the far end of the cable. Thus, a flow of air exists in the cable from the high pressure end thereof to the low pressure end thereof.

If, at a point between the opposite ends of the cable a splice is included to an aerial lead and it is desired that the pressure of air within the cable not extend to the aerial lead, a plug is poured in the aerial lead to avoid unnecessary loss of air pressure which is necessary and vital to the underground cable system, as air pressure aids in eliminating or avoiding the entry of foreign matter such as liquids into the underground cable.

In order to plug the aerial lead a quantity of hardenable thick liquid substance is injected into the aerial lead and once the liquid has hardened a solid air-tight plug will be formed. However, if the slightest amount of air flow exists within the aerial lead at the time the injected hardenable liquid is curing, air trails will be formed within the hardening liquid and will create a leak destroying the intended purpose of the plug.

The method and apparatus of the instant invention have been specifically designed to function in the capacity of maintaining air pressure within the aerial lead equal on opposite sides of the poured plug during the curing of the plug so as to eliminate any air trails through the plug.

Apparatuses similar in structure to the instant invention, but different and provided for other purposes have been heretofore designed. Examples of these previous apparatuses may be found in U.S. Pat. Nos. 2,043,227 to C. E. Bennett, dated June 9, 1936 and 2,449,271 to C. E. Bennett et al, dated Sept. 14, 1948.

The main object of this invention is to provide a method and apparatus for establishing and maintaining equal air pressure on opposite sides of a plug being formed in a communications cable.

Another object of this invention is to provide a method and apparatus for checking the seal established by a plug formed in a communications cable.

Yet another object of this invention is to provide a method and apparatus for establishing a bypass around a plug formed in a communications cable.

A final object of this invention to be specifically enumerated herein is to provide a method and apparatus in accordance with the preceding objects with the apparatus conforming to conventional forms of manufacture being of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 2:
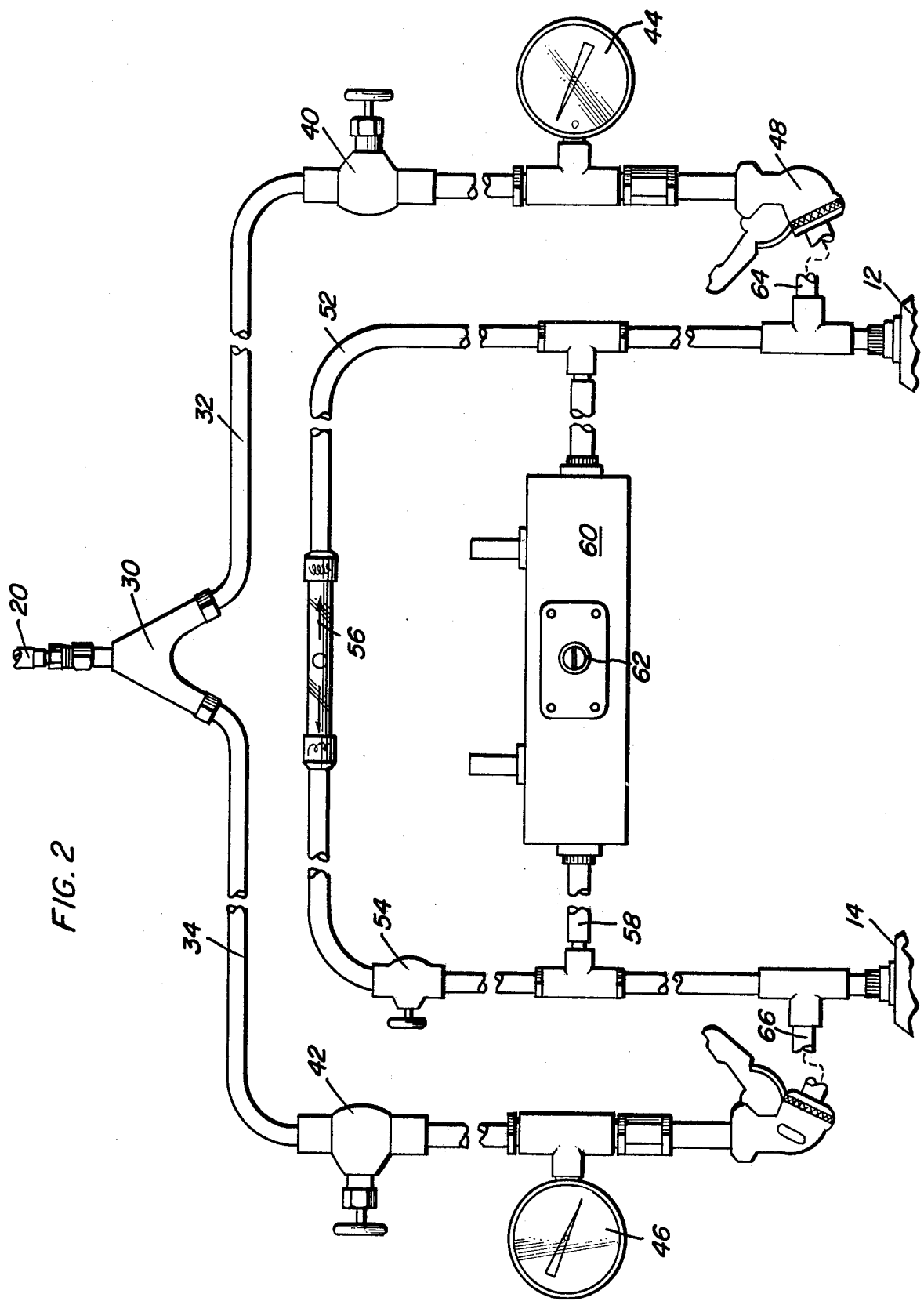

FIG. 1 is a fragmentary section of a communications cable with a portion thereof being broken away and illustrated in vertical section in the area thereof in which a plug is being formed and with the apparatus of the instant invention operatively associated with the communications cable on opposite sides of the plug;

FIG. 2 is an enlarged elevational view of the apparatus of the instant invention with parts thereof being broken away; and FIG. 3 is an elevational view of a section of communications cable including two splice cases and illustrating the manner in which the apparatus of the instant invention may be used to control the air pressure at the two splice cases on opposite sides of a plug to be formed between the two splice cases.

Referring now more specifically to the drawings the numeral 10 designates a communications cable housing section including a pair of cable flanges 12 and 14 spaced therealong and a check flange 16 spaced intermediate the flanges 12 and 14.

Assuming that the interior of the housing 10 is under gas or air pressure at 4 pounds per square inch above atmospheric pressure at the left-hand end of the housing and that the gas or air pressure at the right-hand end of the housing 10 is lower, gas or air flow is present in the housing 10 moving from left to right.

If it is desired to form a plug within the housing 10 between the cable flanges 12 and 14 a caulking gun 18 provided with a cartridge of liquefied plugging compound is attached to the check flange 16 in the manner illustrated in FIG. 1. However, before the liquefied plugging compound may be injected into the housing 10 with assurance that a gas or air-tight plug will be formed as a result of the plugging compound curing within the housing 10, it is absolutely necessary that air pressure within the housing 10 be equalized on opposite sides of the area in which the plug is to be formed.

The apparatus of the instant invention includes a main pressurized gas or air supply line 20 having its inlet end connected to the outlet 22 of a tank of compressed gas or air 24 provided with suitable pressure and air flow gauges and valves 26 and 28. The discharge end of the line 20 is connected to a Y-fitting 30 and a pair of delivery lines 32 and 34 have their corresponding inlet ends 36 and 38 connected to the discharge branches of the Y-fitting 30. The lines 32 and 34 are provided with in-line control valves 40 and 42 and in-line pressure gauges 44 and 46. The outlet ends of the delivery lines 32 include snap-on type air chucks 48 and 50.

The opposite ends of a gas flow line 52 are connected to the cable flanges 12 and 14 and the air flow line 52 includes a shut-off valve 54 and an in-line air flow indicator 56. In addition, a bypass line 58 is connected in parallel with the opposite end portions of the air flow line 52 and the mid-portion of the bypass line 58 includes a double T bypass valve 60 having a control 62.

It will be noted that the opposite ends of the air flow line 52 are provided with branch lines 64 and 66 opening into predetermined zones of the interior of the line 52 and equipped with check valves and to which the snap-on air chucks 48 and 50 are connected.

The liquefied plugging compound contained within the cartridge 68 supported from the caulking gun 18 will harden to form a solid plug within six to twelve hours, depending upon weather conditions, the amount of liquefied plugging compound used and the type of plug used. However, as the compound is injected to form the plug the compound will take the shape of the interior of the housing 10. If there is air flow within the housing 10 during the time the plug is being poured or injected or during the time the plug is curing, air trails will be formed within the plugging compound and thus create an air or gas leak therethrough.

In operation, the pressure and air flow gauges 26 are opened after the lines 20, 32, 34, 52 and 58 have been assembled and attached to the flanges 12 and 14 in the manner illustrated in FIG. 1. The air being introduced into the cable housing 10 is maintained at a pressure approximately one pound greater than the original internal pressure of the housing 10. With the valve 54 open the air flow indicator is noted to determine any flow of air through the air flow line 52 and adjustments in either one or both of the valves 40 and 42 are made until such time as the air flow indicator 56 renders an indication of no air flow therethrough. Then, the caulking gun 18 is actuated to inject the liquefied plugging compound to form the plug 70 and the air flow indicator 56 is checked to be assured of a no-flow condition during the injection of the liquefied plugging compound. If any air flow is indicated during pouring of the plug the necessary adjustments in the valves 40 and 42 are made to again achieve a no-flow condition through the air flow line 52.

Once the plug 70 has been poured and sufficient time has passed for the plug to take form, the air chucks 48 and 50 are removed and at substantially the same time the bypass valve 60 is opened to allow air flow around the plug instead of allowing pressure to build up on either side of the plug. Once the plug 70 has hardened the plug may be tested by reconnecting the air chucks 48 and 50 with the valves 40, 42 and 54 closed and closing the bypass valve 60 and admitting air under pressure into one side of the bypass valve 60. Once the air pressure is applied the air pressure in the housing 10 on the other side of the plug is monitored with one of the corresponding gauge 44 or 46. If the plug 70 is good there will not be an increase in air pressure at the gauge.

With attention now invited more specifically to FIG. 3 of the drawings there may be seen a second cable housing referred to in general by the reference numeral 10' and which includes a pair of longitudinally spaced splice cases 11 and 13 to which the opposite ends of the air flow line 52 may be connected in lieu of two cable flanges such as the flanges 12 and 14. Of course, the plug to be formed in the cable housing 10' will be disposed intermediate the splice cases 11 and 13.

The foregoing is considered as illustrative only of the principles of the invention. Further, since numerous modifications and changes will readily occur to those skilled in the art, it is not desired to limit the invention to the exact construction and oepration shown and described, and accordingly all suitable modifications and equivalents may be resorted to, falling within the scope of the invention.

What is claimed as new is as follows:

1. In a communications cable system of the type including a tubular housing and wherein the interior of the housing is maintained under gas pressure above ambient pressure and normally experiences a gas flow through the housing in one direction from a first portion toward a second portion of slightly lower pressure; the method of forming a fluid and gas-tight plug in a first zone of the interior of said housing spaced intermediate said first and second portions by the injection of a plug of fluent gas impervious hardenable material in said first zone, said plug being subject to gas trails being forced therethrough prior to at least initial hardening of said material in the absence of substantially equal gas pressure within said housing on opposite sides of said plug, said method comprising:
   a. establishing a closed external gas flow line communicated at its opposite ends with second and third zones of the interior of said housing intermediate said first and second pressurized portions and on opposite sides of said first zone,
   b. introducing gas into at least the end portion of said external flow line which opens into said housing downstream from said first zone and at a rate and pressure sufficient to terminate the flow of gas through said first zone,
   c. pouring a plug of hardenable fluent air impervious material into said first zone, and
   d. thereafter maintaining said gas pressure on opposite sides of said plug equal throughout at least the initial curing period of said plug.

2. The method of claim 1 wherein said flow line includes a flow meter serially mounted therein; the maintaining of the gas pressure on opposite sides of said plug equal including monitoring said flow meter and adjusting the rate and pressure of gas introduced into said flow line to maintain a "no flow" reading of said flow meter.

3. The method of claim 2 wherein the introduction of gas into said flow line includes the introduction of gas under pressure into predetermined zones of both opposite end portions of said flow line on opposite sides of said flow meter.

4. The method of claim 3 including a bypass line connected in parallel with said flow line and with its opposite ends opening into the flow line between said predetermined zones and on opposite sides of said flow meter, said bypass line including a closed bypass valve therein and said flow line, intermediate said air flow meter and one of said predetermined zones, having an open shut-off valve therein;
   e. and at least substantially simultaneously opening and closing said bypass and shut-off valves.

* * * * *